(12) United States Patent
Bossotto

(10) Patent No.: US 6,489,593 B2
(45) Date of Patent: Dec. 3, 2002

(54) LOCATING AND LOCKING UNIT FOR WELDING SHEET METAL PARTS OF A MOTOR-VEHICLE BODY

(75) Inventor: Piero Bossotto, Turin (IT)

(73) Assignee: Comau S.P.A., Turin (IT)

( * ) Notice: Subject to any disclaimer, the term of this patent is extended or adjusted under 35 U.S.C. 154(b) by 20 days.

(21) Appl. No.: 09/749,905

(22) Filed: Dec. 29, 2000

(65) Prior Publication Data

US 2001/0009253 A1 Jul. 26, 2001

(30) Foreign Application Priority Data

Jan. 21, 2000 (IT) .................................. TO2000A000061

(51) Int. Cl.[7] ........................... B23K 9/12; B23K 11/10; B23K 37/04
(52) U.S. Cl. ........................... 219/159; 219/79; 219/80; 219/161; 228/44.3; 228/49.4
(58) Field of Search .................................. 219/158, 159, 219/161, 79, 80; 228/44.3, 49.1, 49.4

(56) References Cited

U.S. PATENT DOCUMENTS

| | | | | |
|---|---|---|---|---|
| 4,811,891 A | * | 3/1989 | Yamaoka et al. | |
| 4,856,701 A | * | 8/1989 | Pockl | |
| 5,528,818 A | * | 6/1996 | Warneke | |
| 5,560,535 A | * | 10/1996 | Miller et al. | |
| 5,902,496 A | * | 5/1999 | Alborante | |
| 6,008,471 A | * | 12/1999 | Alborante | |
| RE36,541 E | * | 2/2000 | Rossi | |
| 6,065,199 A | * | 5/2000 | Bossotto et al. | |
| 6,138,889 A | * | 10/2000 | Campani et al. | |
| 6,250,533 B1 | * | 6/2001 | Otterbein et al. | |

FOREIGN PATENT DOCUMENTS

EP 0903197 A1 * 11/2001

OTHER PUBLICATIONS

US 2001/0009253 A1 Bossotto (Jul. 26, 2001).*
US 2001/0050206 A1 Oldford et al. (Dec. 13, 2001).*

* cited by examiner

*Primary Examiner*—Tom Dunn
*Assistant Examiner*—Kiley Stoner
(74) *Attorney, Agent, or Firm*—Sughrue Mion, PLLC

(57) ABSTRACT

A locating and locking unit for sheet metal parts which are to be assembled by electric spot-welding on a motor-vehicle body, comprising a base platform, for receiving the trolley of a positioning frame equipped with locating and locking devices for the parts to be welded. The base platform can be rotated between a non-operative horizontal position and an inclined position in which the positioning frame can engage the parts to be welded in a welding station along the assembly line. Locating elements are provided for defining the precise position of the positioning frame along two mutually orthogonal axes in a plane that is perpendicular to the axis of the line and along an axis parallel to the line.

6 Claims, 9 Drawing Sheets

LOCATING AND LOCKING UNIT FOR WELDING SHEET METAL PARTS OF A MOTOR-VEHICLE BODY

BACKGROUND OF THE INVENTION

The present invention relates to a locating and locking unit for sheet metal parts which are for assembling on a motor-vehicle body by electric spot-welding.

Plants for assembling motor-vehicle bodies by electric spot-welding are already known, of the type comprising:

a movable positioning frame on one side of the assembly line, parallel to the line and movable between a working position in a welding station and waiting position spaced apart therefrom, wherein the said positioning frame includes a self-propelled lower trolley running on rails positioned parallel to the assembly line and an upper part free of guides, carrying locating and locking devices for locking the parts to be welded in the correct assembling position, and a base platform, situated at the side of the line at the welding station, for receiving the positioning frame when this is brought to its working position, the said platform being able to move transversally with respect to the line to bring the positioning frame received thereon to a position closer to the axis of the line for engaging the parts to be welded.

Assembling plants of the above-described type are disclosed in, for example, EP-A-0 642 878 and EP-A-0 835 717, in the name of the same Applicant.

The object of the present invention is to provide a locating and locking unit having the above described features which is simple, reliable and with reduced dimensions, and which is particularly suitable for assembling individual elements or small subgroups on a motor-vehicle body which is being assembled.

To achieve this object, the invention provides a locating and locking unit having the above indicated features and also characterized in that the aforesaid base platform is pivotably mounted on a fixed support structure around an axis parallel to the line.

The base platform can be moved between a substantially horizontal first position, suitable for receiving the trolley of the positioning frame, and a second position, rotated towards the assembly line for engagement of the positioning frame on the parts to be welded, said unit also including motorized means for driving the movement of the base platform, including a crank rotatable on the fixed support structure and carrying a pin that is slidably engaged in a slot made in a bracket of the base platform.

SUMMARY OF THE INVENTION

According to an additional feature, the base platform is equipped with a locating element that has a cavity with a V-shaped surface suitable for engaging itself in the aforesaid rotated position of the base platform over the surface of a cylindrical element freely rotatably mounted on the fixed support structure around an axis that is parallel to and slightly offset from the articulation axis of the base platform, for providing a reference for the precise position of the base platform along two orthogonal axes in a plane that is perpendicular to the line.

A further feature of the invention lies in that the said base platform is equipped with a pair of freely rotatable rollers, whose axes are vertical when the platform is in its horizontal position, and suitable for engaging with the two sides of a wedge-shaped element carried by the fixed support structure when the platform is brought into the aforesaid rotated position, for providing a reference for the precise position of the base platform along an axis parallel to the line.

In addition, the aforesaid base platform and/or the aforesaid positioning frame are equipped with engagement elements suitable for cooperating, in the aforesaid rotated position of the base platform, with locking clamps carried by the fixed support structure to stably lock the positioning frame.

BRIEF DESCRIPTION OF THE DRAWINGS

Further features and advantages of the invention will emerge from the description that follows, with reference to the enclosed drawings, which are provided purely as a non-limitative example, and where.

DETAILED DESCRIPTION OF THE INVENTION

Figure 1:
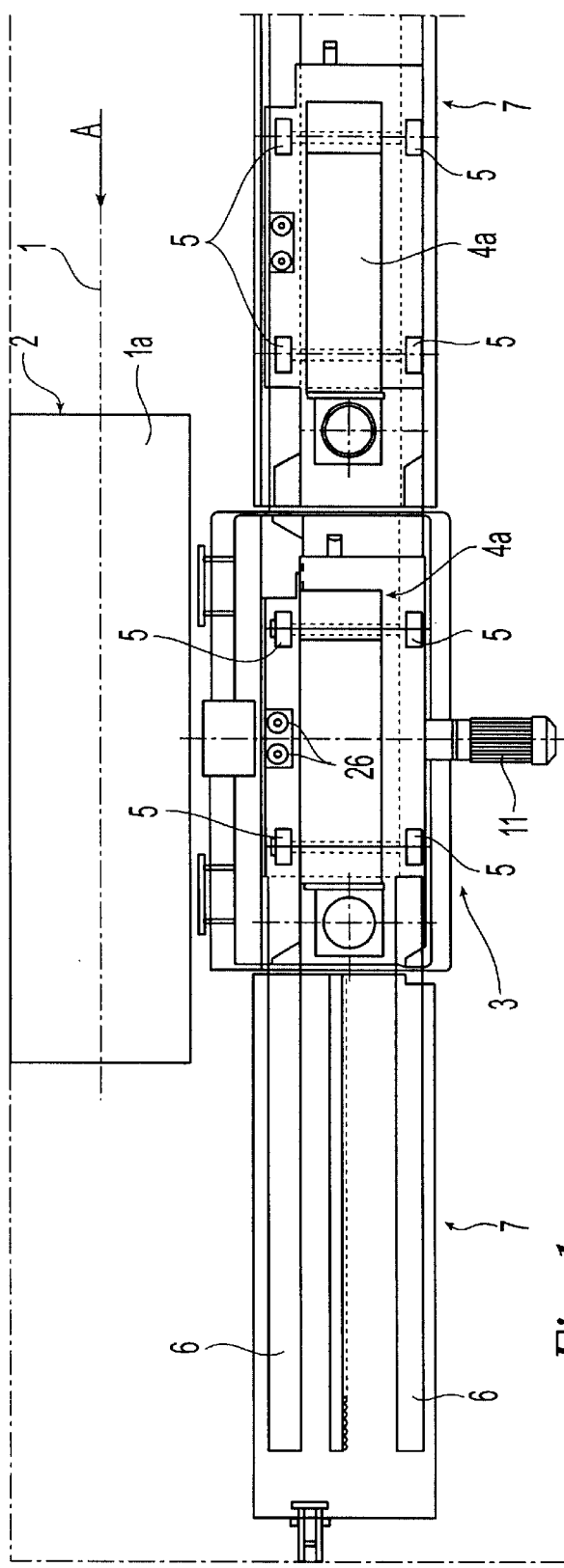
FIG. 1 is a partial plan view of a welding station using a locating and locking unit according to the invention.

In FIG. 1, reference number 1 indicates a diagrammatically illustrated assembly line for motor-vehicle bodies. The bodies 1 proceed in line along line 1 in the direction of the arrows A. The means of transport for the bodies along the line are not illustrated here as they can be made in any known manner and because these means are not within the scope of the present invention. Each body stops for the necessary time at a welding station 2 where additional sheet metal parts are welded to the body. Always according to the known technique, the welding station 2 is equipped with electric spot welding means of any known type, preferably programmable welding robots. Similarly, for the same reasons as indicated above, the means of welding are not illustrated here.

In addition, according to the known technique, the sheet metal parts that are welded at the welding station 2 must be located and locked during the welding operation. For this purpose, at the two sides of the line 1 where the welding station 2 is situated, two locating and locking units 3 conforming to the present invention are provided; only one of these (the one situated to the left of the line 1 with respect to the direction of advancement A) is illustrated in the enclosed drawings. The locating and locking unit that is not shown is naturally identical to and symmetrical with respect to unit 3.

Locating and locking means 1a are provided in correspondence to the welding station 2 for locating and locking the vehicle body that passes along the line and stops at the welding station 2.

Each locating and locking unit 3 carries a positioning frame 4 equipped with a series of locating and locking devices for engaging the parts to be welded such that they remain locked in precise assembly positions during the welding operations. The locating and locking devices carried by the positioning frame 4 are not shown in the enclosed drawings as they can be made in any known manner and because these means are not within the scope of the present invention. The elimination of these constructional details from the drawings renders the latter quicker and easier to understand.

Figure 2:
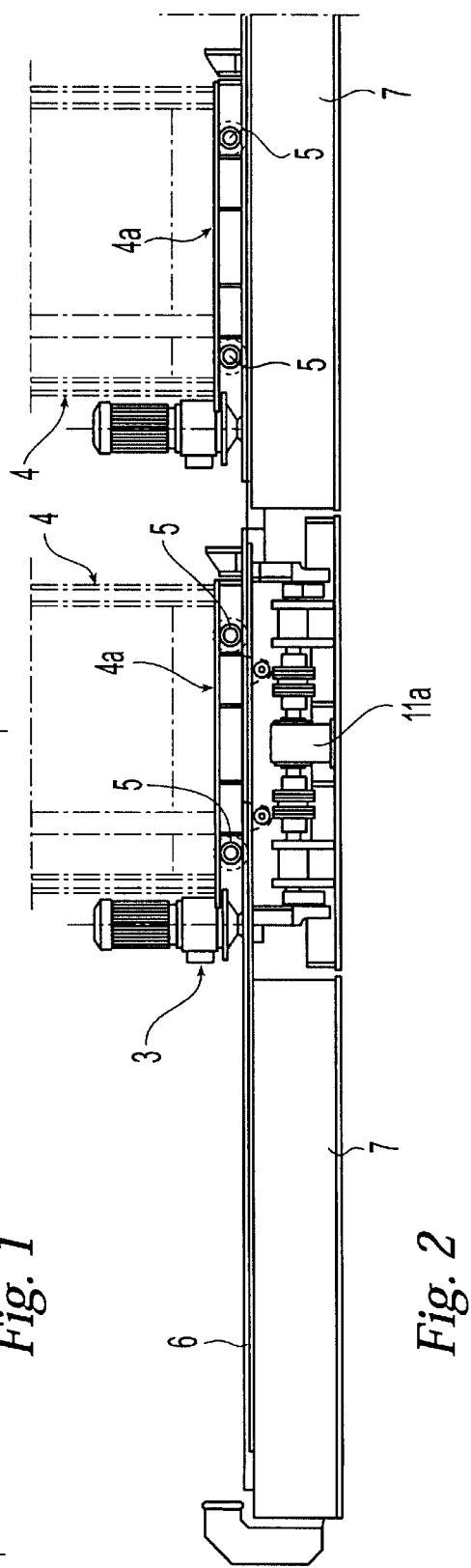
FIG. 2 is a side view of the plant shown in FIG. 1.

In the case of the preferred form of actuation that is illustrated in the enclosed drawings and always according to the known technique, in reality two positioning frames 4 (see FIG. 2), each of which is equipped with locating and locking devices for use with a different type of structure to be welded, are positioned on each side of the line 1. The two positioning frames 4 are capable of sliding parallel to the line to exchange positions with each other in correspondence to the welding station, according to the type of body that has stopped at the welding station. For this purpose, each positioning frame comprises an upper part, free of the guides, carrying the various locating and locking devices, and a lower self-propelled trolley 4a, with wheels 5 running on rails 6. These rails are present on unit 3 as well as on both fixed benches 7, respectively positioned before and after the unit 3, with reference to the direction of advancement A. In the enclosed drawings, FIG. 2 shows the two positioning frames 4 set up on one side of the line 1 in an initial state, where the chassis illustrated on the right is in the wait position. Should the type of body to be welded change, the pair of positioning frames 4 move to the left (with reference to FIG. 2), so that the positioning frame shown to the right moves to the operative position, while the positioning frame shown to the left moves to the wait position on the fixed bench positioned after the unit 3.

Figure 4:
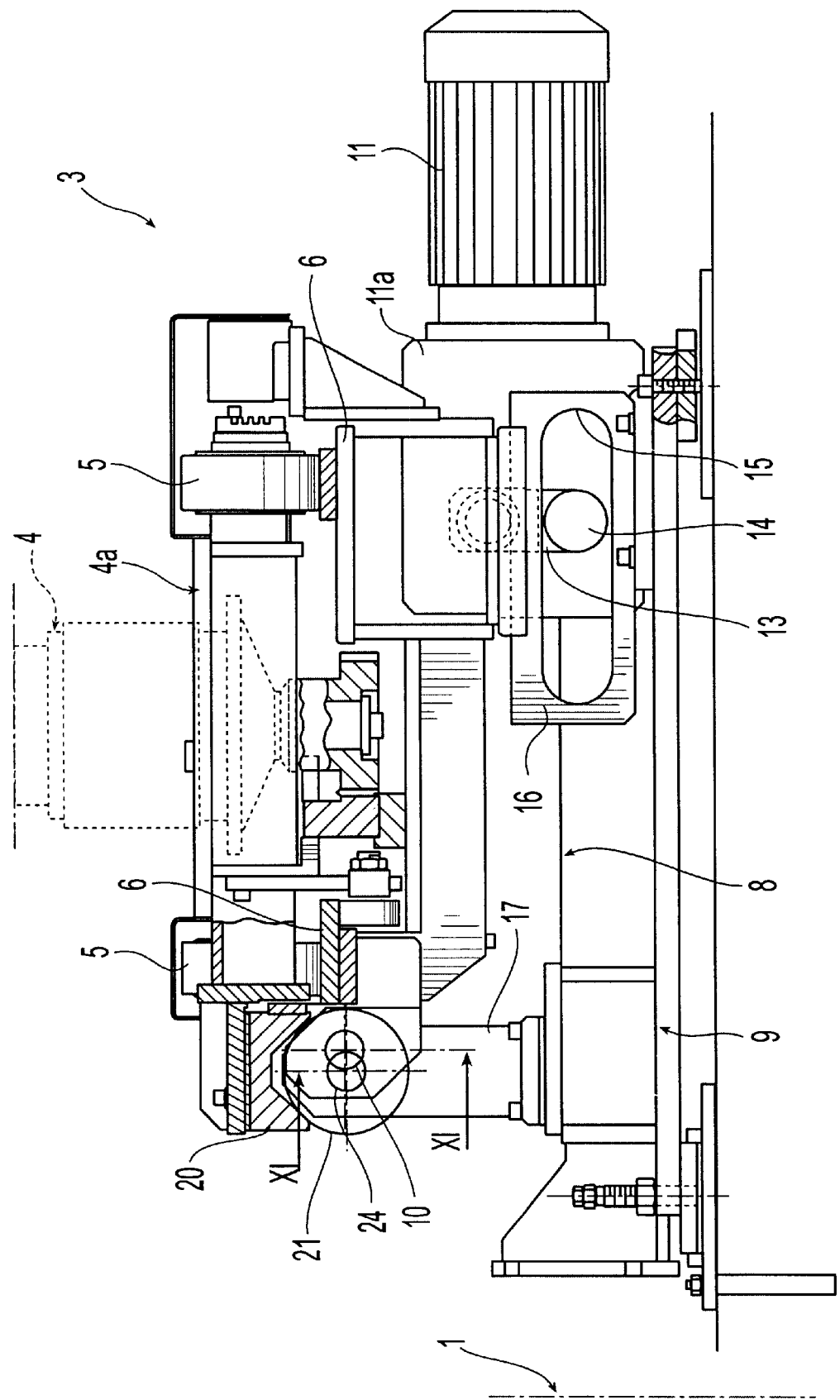
FIGS. 4 and 5 illustrate a section of the unit shown in FIG. 3 in a plane perpendicular to the assembly line and in two different operating states.
Figure 5:
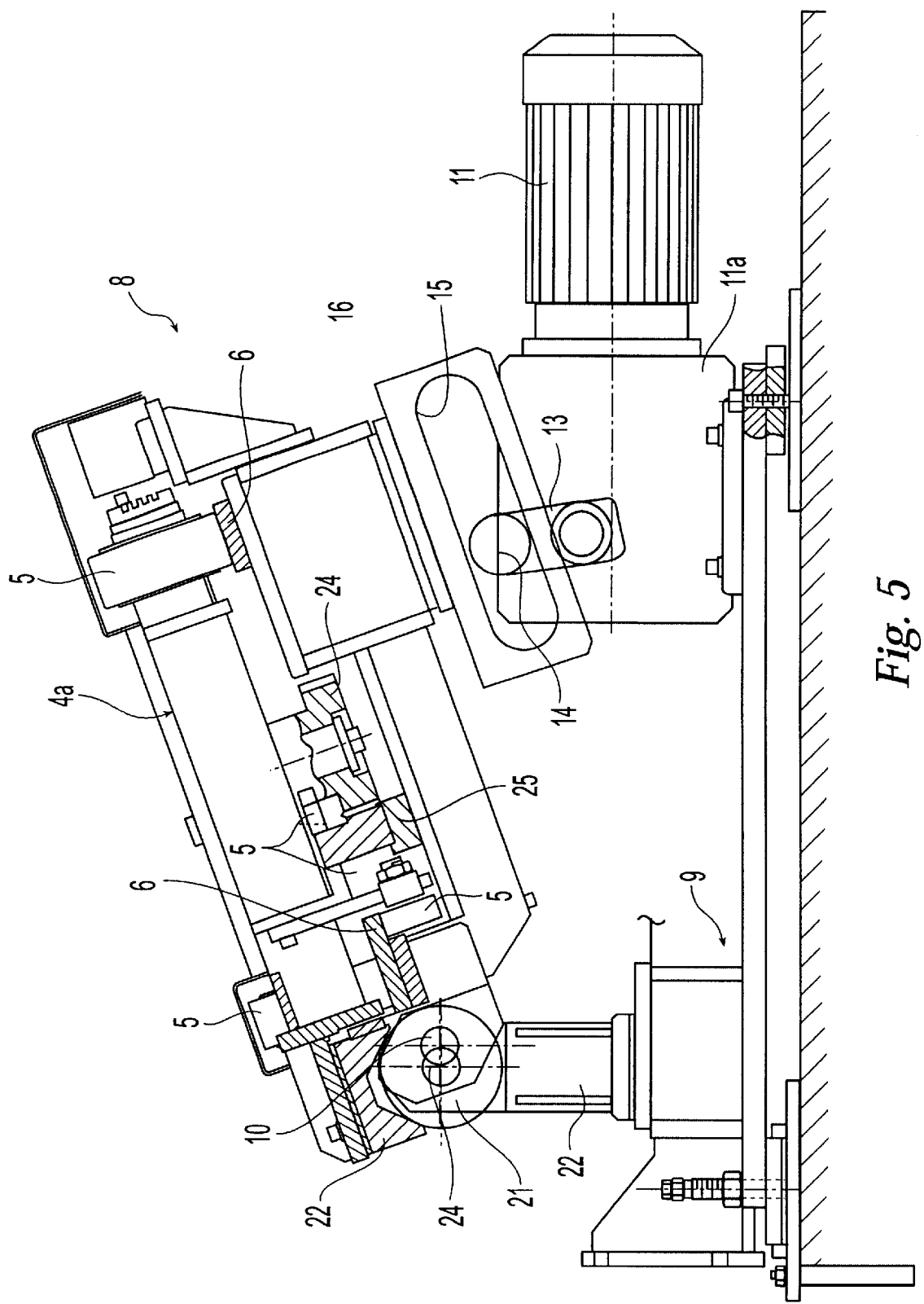

With reference to FIGS. 4 and 5, on the locating and locking unit 3, the rails 6 that receive the wheels 5 of the trolley 4 are mounted on a base platform 8 which can swivel on a fixed support structure 9 around an axis 10 parallel to the line 1.

Figure 3:
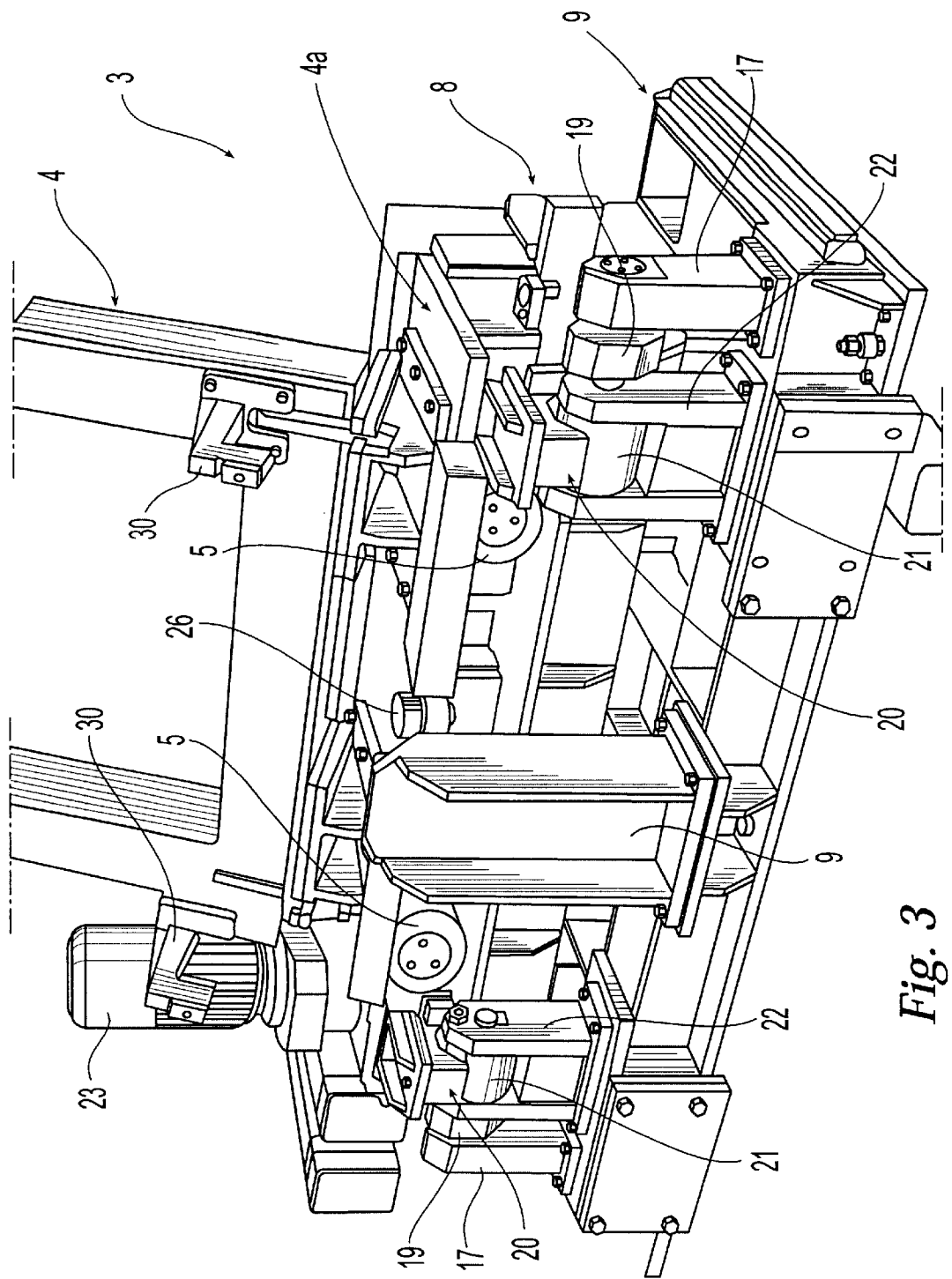
FIG. 3 is a partial perspective view of a locating and locking unit according to the invention.

With particular reference to FIGS. 4 and 5, the base platform 8 can move between an inoperative horizontal position, in which the respective positioning frame 4 is inclined backwards (see FIG. 3) with respect to the plane of the line 1, and an operative position rotated towards the line 1 (FIG. 5), in which the positioning frame 4 is more-or-less vertical so that the locating and locking devices that it carries can engage the parts to be welded on the line.

Figure 6:
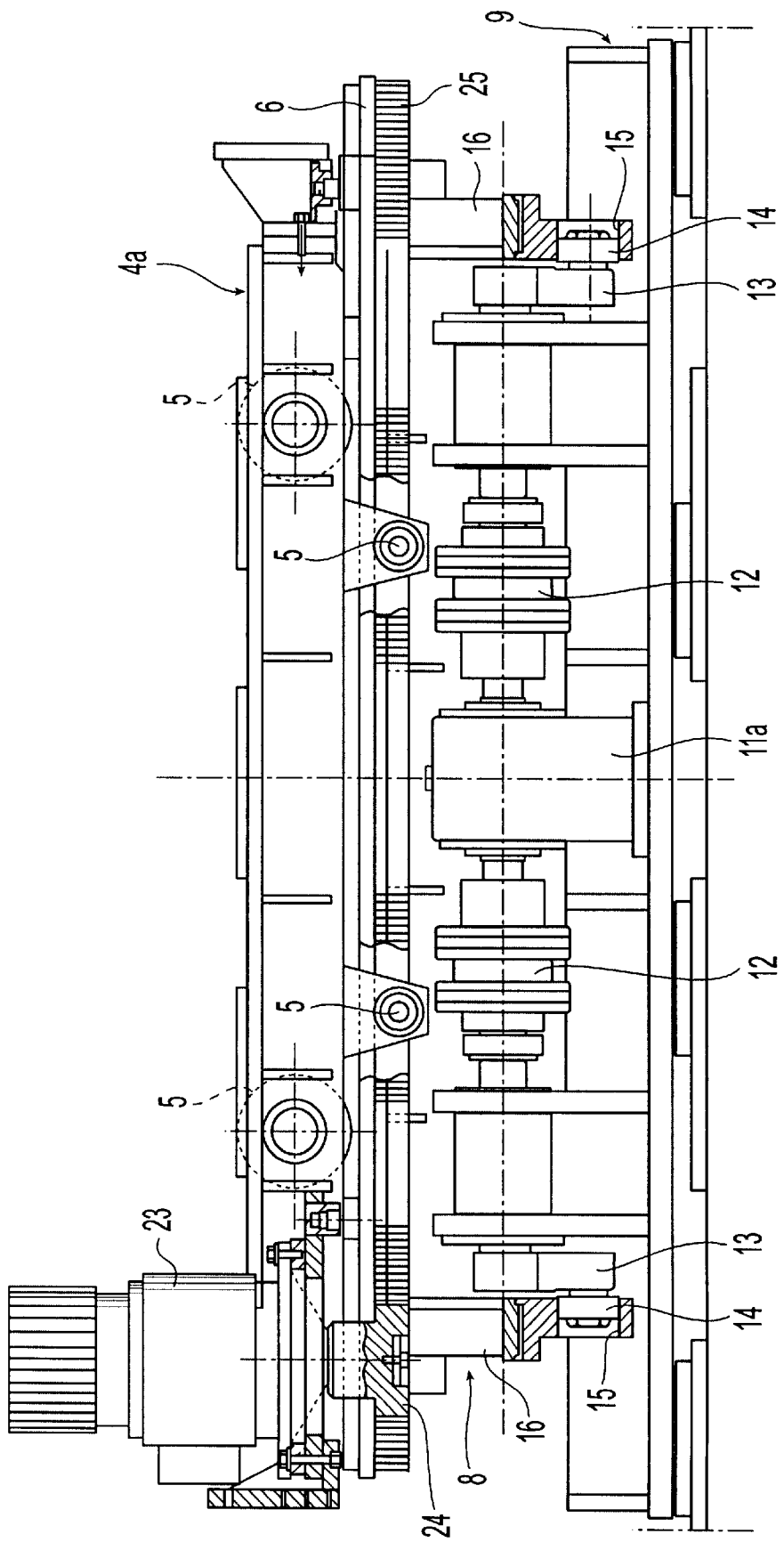
FIG. 6 is a larger-scale side view of a unit according to the invention.

The movement of the base platform 8 is controlled by a motor 11 and a reduction unit 11a (for example, an electric motor and a hydraulic motor) that control (see FIG. 6), via two joints 12, a pair of cranks 13, each of which carries a roller 14 at its free end, the said roller engaging with a slotted hole 15 on a bracket 16 carried by the base platform 8 (see also FIGS. 4 and 5). With reference to FIGS. 3–5 and 11, the base platform 8 is mounted on the fixed support structure 9 so that it can swivel around the said axis 10. More precisely, the fixed support structure 9 has a pair of uprights 17 (FIGS. 3, 11), each carrying a pivot pin 18 (FIG. 11) on which a support 19, forming part of the base platform 8, can swivel.

Figure 10:
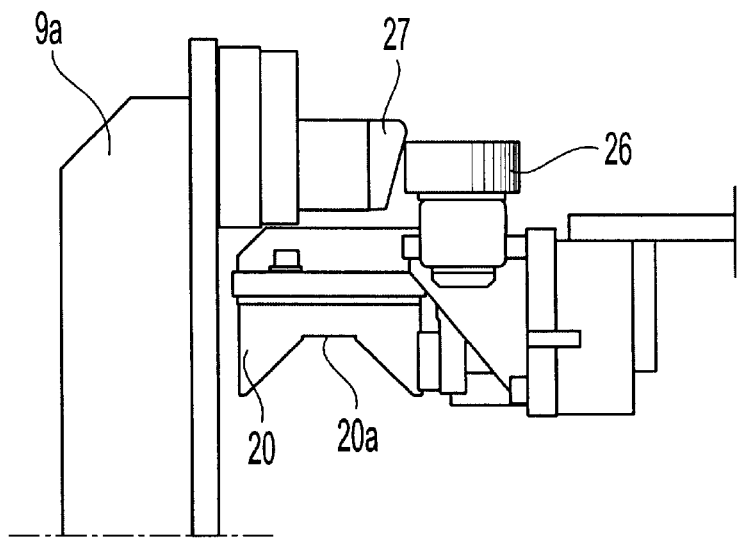
FIG. 10 shows a further detail of the unit according to the invention.
Figure 11:
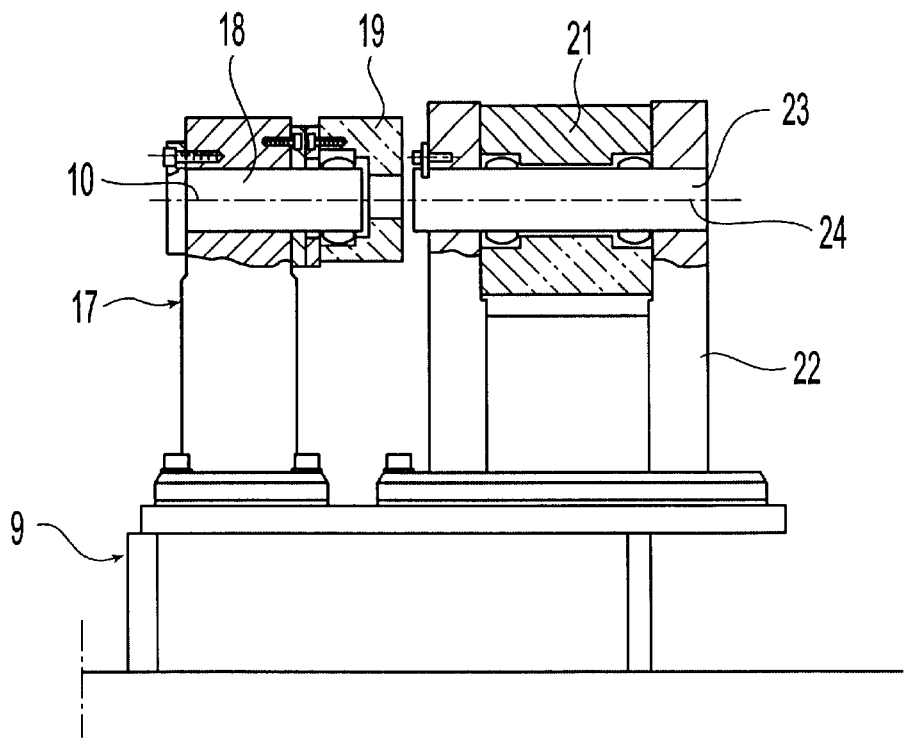
FIG. 11 is a section view along the XI—XI line of FIG. 4.

In order to provide a precise location for the operative position of the positioning frame along two orthogonal axes in a plane perpendicular to the line 1, the base platform 8 presents two locating elements 20, each with a downward facing, V-shaped cavity 20a (see FIG. 10) suitable for engaging, when the base platform 8 is in the raised position illustrated in FIG. 5, the surface of two respective cylindrical rollers 21 that are mounted to freely rotate on fixed brackets 22 of the structure 9. With reference to FIGS. 4, 5 and 11, the rollers 21 are mounted on pivots 23 with an axis 24 that is slightly offset from axis 10. In this way, the rotation of the base platform 8 from the horizontal position shown in FIG. 4 to the raised position shown in FIG. 5 causes the surface of the cavity 20a of the locating elements 20 to engage on the respective cylindrical rollers 21, which thus form a reference location for the precise position of the positioning frame 4 along two mutually orthogonal axes in a plane perpendicular to the axis of the line 1.

Figure 7:
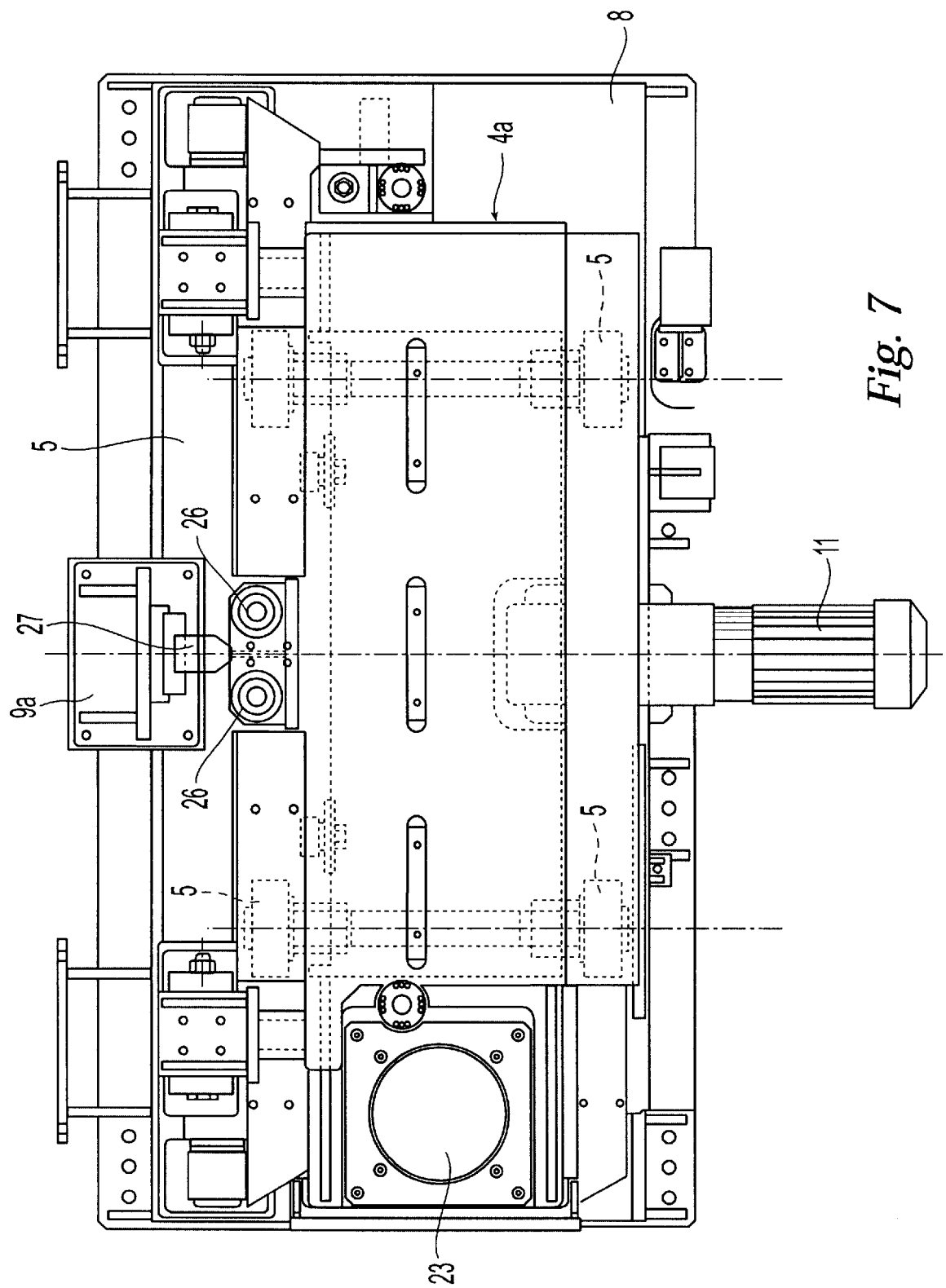
FIG. 7 is a plan view of the unit illustrated in FIG. 6.

In order to control the translation of the trolley 4a, each trolley 4a carries an onboard motor 23 (see FIG. 3 for example) that controls the rotation of a pinion 24 (FIGS. 4, 5), which meshes with a rack 25 carried by the base platform 8. The base platform structure also carries a pair of rollers 26, the axis of which is vertically oriented when the base platform is horizontal (FIGS. 3, 10), and which can engage on the two sides of a wedge-shaped element 27 mounted on a bracket 9a forming part of the fixed support structure 9 (see FIGS. 1, 3, 10) to provide a precise reference location for the position of the chassis 4 along an axis parallel to the line 1 (also see FIG. 7).

Figure 8:
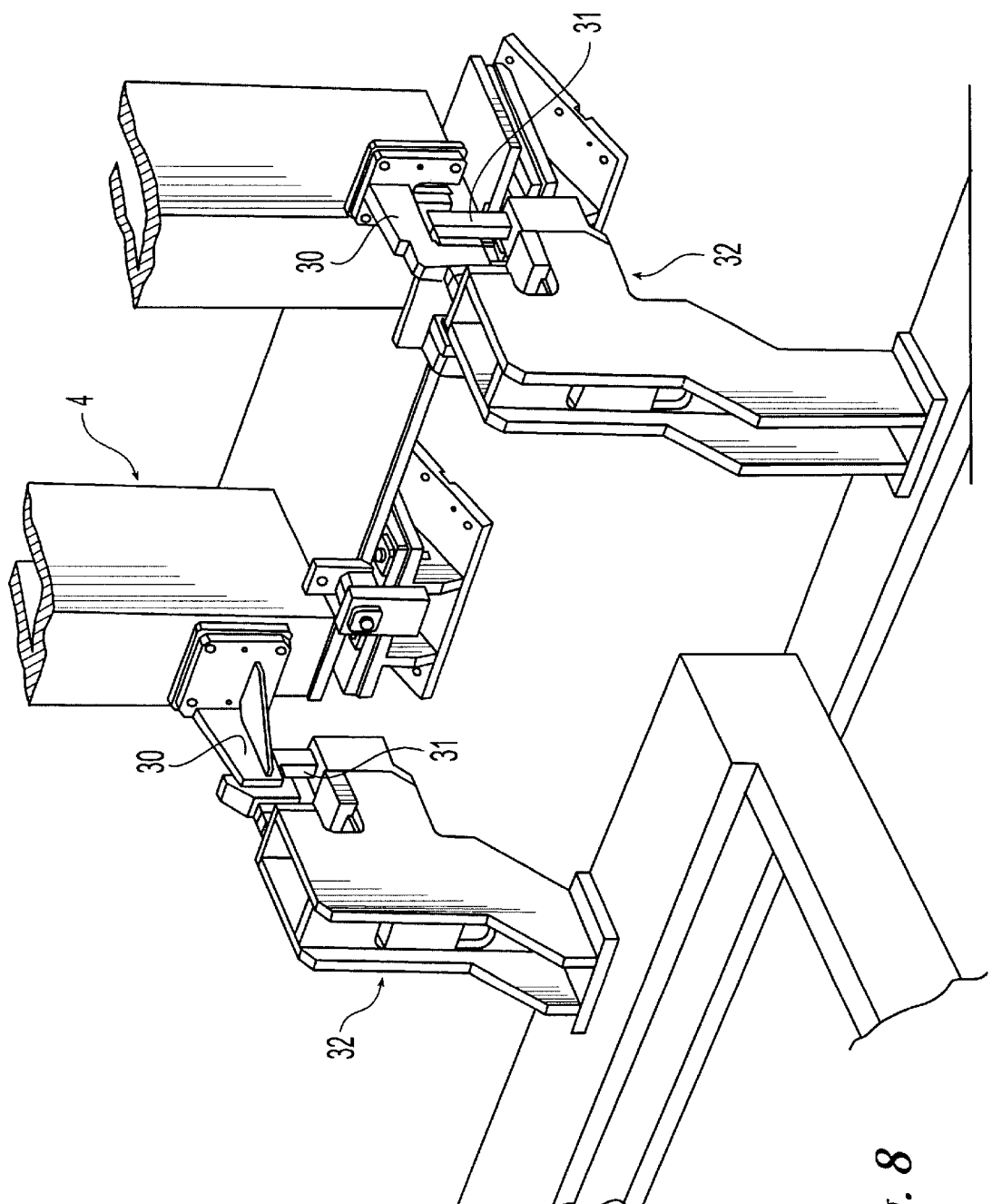
FIG. 8 is a larger-scale perspective view of a further detail of the unit according to the invention.
Figure 9:
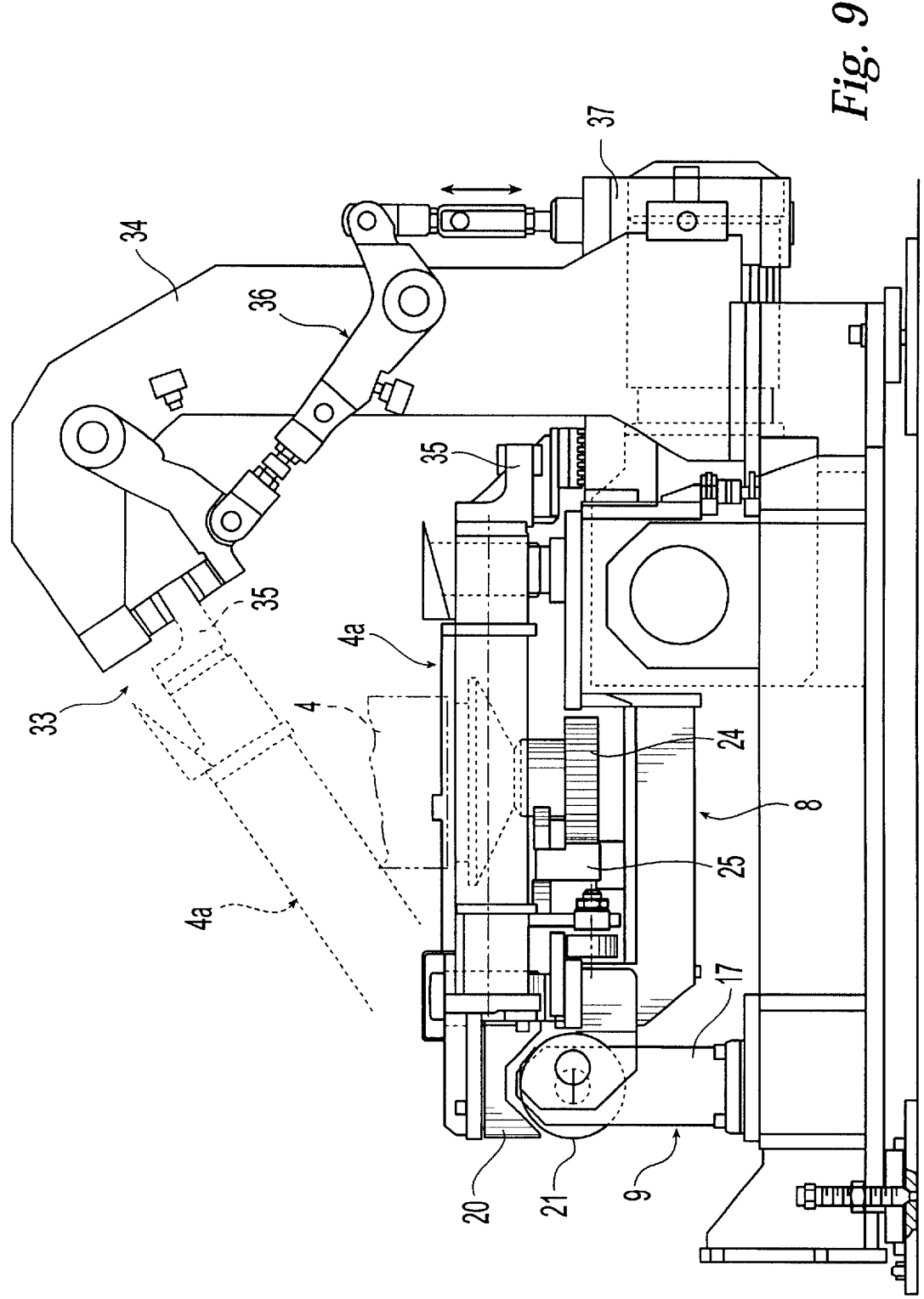
FIG. 9 illustrates an end-view of a variant of the unit according to the invention.

With reference to FIG. 8, when the positioning frame 4 is in the operative position, it has engagement elements 30 projecting from its side facing the assembly line that engage with locking grips 31 carried by fixed structures positioned along the line, FIG. 9 illustrates a variant, in which the locking of the positioning frame in the operative state is effected via a grip 33 mounted on an upright 34, situated nearby the external side of the base platform 8, engaging with an element carried on the trolley 4a. A control cylinder 37 controls the grip 33 via a system of levers 36.

Naturally, it is understood that while respecting the principle of the invention, the constructional details and the forms of realization could be extensively changed with respect to that described and illustrated purely for the purposes of exemplification, without leaving the scope of this invention.

What is claimed is:

1. A locating and locking unit for sheet metal parts which are to be welded together, said unit comprising:

a positioning frame on one side of an assembly line and parallel to the line, which can move between a work position in a welding station and a waiting position spaced apart from the latter, in which said positioning frame includes a lower self-propelled trolley guided by rails set up parallel to the assembly line and an upper part, free of guides, carrying locating and locking devices for locking the parts to be welded in a correct assembly position, and a base platform situated at a side of the line at the welding station and for receiving the positioning frame when the positioning frame is brought to its working position, said platform being able to move transversely with respect to the line to bring the positioning frame received thereon to a position closer to the axis of the line for engaging the parts to be welded on the line, wherein the said base platform is pivotably mounted on a fixed support structure around a swivel axis parallel to the line, and wherein the said base platform is movable between a substantially horizontal first position, suitable for receiving the trolley of the positioning frame, and a second position, rotated towards the assembly line for engagement of the positioning frame on the parts to be welded, said unit also including motorized means for driving movement of the base platform, including a crank rotatable on the fixed support structure and carrying a pin that engages with and can slide in a slot made in a bracket of the base platform.

2. A locating and locking unit according to claim 1, wherein the said base platform is equipped with a locating element with a V-shaped surface suitable for engaging itself in said second position of the base platform over the surface of a cylindrical element freely rotatably mounted on the fixed support structure around an axis that is parallel to and slightly offset from the swivel axis of the base platform, for supplying a reference location for the precise position of the base platform along two orthogonal axes in a plant that is perpendicular to the line.

3. A locating and locking unit according to claim 1, wherein the said base platform is equipped with a pair of freely rotatable rollers, whose axes are vertical when the platform is in its horizontal position, and suitable for engaging with the two sides of a wedge-shaped element carried by the fixed support structure when the platform is brought into the aforesaid rotated position, for providing a reference for the precise position of the base platform along an axis parallel to the line.

4. A locating and locking unit according to claim 1, wherein the said base platform and/or said positioning frame are equipped with engagement elements suitable for cooperating, in said second position of the base platform, with locking clamps carried by the fixed support structure to stably lock the positioning frame.

5. A locating and locking unit according to claim 1, wherein the said trolley carries an onboard motor that controls the rotation of a vertical-axis pinion, which meshes with a rack carried by the base platform.

6. Plant for assembling sheet metal parts on motor-vehicle bodies via electric spot-welding, comprising a line for moving the bodies through a welding station, wherein two locating and locking units according to claim 1, are situated on both sides of the line at the welding station, wherein two fixed benches are installed on each side of the line, before and after the respective locating and locking unit, said fixed benches having rails aligned with the rails of the said unit, and wherein two positioning frames are installed on each side of the line, which can exchange position over said base platform by running on said rails of the respective locating and locking unit and the fixed benches, each positioning frame being set up for a different type of structure to be welded.

* * * * *